United States Patent
Yamashiro

(10) Patent No.: US 7,545,713 B2
(45) Date of Patent: Jun. 9, 2009

(54) ACCESS METHOD, INFORMATION RECORDING AND REPRODUCING APPARATUS, AND RECORDING MEDIUM

(75) Inventor: Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 515 days.

(21) Appl. No.: 11/302,123

(22) Filed: Dec. 14, 2005

(65) Prior Publication Data

US 2006/0153034 A1    Jul. 13, 2006

(30) Foreign Application Priority Data

Dec. 16, 2004    (JP) ............................. 2004-363960

(51) Int. Cl.
*G11B 19/00*    (2006.01)
(52) U.S. Cl. ................ 369/47.4; 369/47.43; 369/47.45
(58) Field of Classification Search .............. 369/47.36, 369/30.12, 30.23, 30.24, 47.23, 47.29, 47.3, 369/47.38–47.49, 47.55, 239, 240, 47.4
See application file for complete search history.

(56) References Cited

U.S. PATENT DOCUMENTS

| | | | |
|---|---|---|---|
| 5,872,753 A | 2/1999 | Morimoto | |
| 6,754,442 B1 * | 6/2004 | Nagai et al. | ................. 386/125 |
| 2003/0223337 A1 | 12/2003 | Kimura et al. | |
| 2004/0105354 A1 | 6/2004 | Kimura et al. | |
| 2004/0154031 A1 | 8/2004 | Kimura et al. | |

FOREIGN PATENT DOCUMENTS

| | | |
|---|---|---|
| JP | 61-177639 | 8/1986 |
| JP | 5-342599 | 12/1993 |
| JP | 2000-113584 | 4/2000 |
| JP | 2001-338469 | 12/2001 |
| JP | 2004-015823 | 1/2004 |

\* cited by examiner

*Primary Examiner*—Wayne R Young
*Assistant Examiner*—Brian Butcher
(74) *Attorney, Agent, or Firm*—Dickstein Shapiro LLP

(57) ABSTRACT

An access method for use when switching from recording into an optical disk to reproduction from the optical disk or vice versa is disclosed that comprises a step of calculating a rotating speed n2 of a motor for rotating the optical disk given that linear velocities in a first access position before the switching and a second access position after the switching are equal, a step of determining whether n2 satisfies a pair of expressions $n2>n0$ and $n2>n1$ or a pair of expressions $n2<n0$ and $n2<n1$ where n0 and n1 are rotating speeds of the motor before and after the switching, a step of changing a control mode from CLV to CAV and the rotating speed from n0 to n1 if one of the pairs of expressions is satisfied, and a step of shifting a position to be accessed from the first access position to the second access position.

3 Claims, 13 Drawing Sheets

ACCESS METHOD, INFORMATION RECORDING AND REPRODUCING APPARATUS, AND RECORDING MEDIUM

BACKGROUND OF THE INVENTION

1. Field of the Invention

The present invention generally relates to an access method, an information recording and reproducing apparatus, and a recording medium, and particularly relates to an access method, an information recording and reproducing apparatus, and a recording medium capable of recording and reproducing information into and from an optical disk when switching from an operation of recording information into an optical disk to an operation of reproducing information from the optical disk or switching from an operation of reproducing to an operation of recording.

2. Description of the Related Art

In recent years, recording video data into optical disks, such as DVDs (digital versatile discs), has become common due to improvements in digital techniques and data compression techniques. Examples of commercially available apparatuses for recording video data into optical disks include optical disk devices used with personal computers, and DVD recorders, which are suitable especially for recording contents provided via cable and satellite as video data. In these apparatuses, optical disks are rotated by spindle motors.

If such an apparatus has a time shift function, the apparatus can reproduce content from the beginning even when the content is still being recorded into an optical disk (see, for example, Patent Document 1). For doing so, recording and reproduction are alternately performed. In this type of apparatus, an optical pickup device seeks a reproduction position separate from a recording position when switching from recording to reproduction, and seeks a recording position separate from a reproduction position when switching from reproduction to recording.

Generally, so-called CLV (Constant Linear Velocity) mode, in which a spindle motor is controlled so as to make the linear velocity constant, is used when video data are recorded into an optical disk, whereas so-called CAV (Constant Angular Velocity) mode, in which the spindle motor is controlled so as to make the angular speed constant, is used when the video data recorded in the optical disk are reproduced.

In some cases, the rotating speed of the spindle motor for recording is different from the rotating speed for reproduction, and therefore the rotating speed of the spindle motor is changed when switching between recording and reproduction.

That is, when the time shift function is activated, a seeking operation of the optical pickup device and a changing operation of the rotating speed of the spindle motor are repeatedly performed. In order to perform recording and reproduction smoothly, it is desirable to shorten time required for the seeking operation and time required to change the rotating speed.

An apparatus disclosed in Patent Document 1 is configured such that the rotating speed of a spindle motor for reproduction is equal to the rotating speed for recording, and therefore does not need to change the rotating speed of the spindle motor when switching between recording and reproduction. In some cases, however, reproduction conditions are not suitable, so that image quality might be reduced.

[Patent Document 1] Japanese Patent Laid-Open Publication No. 2004-15823

SUMMARY OF THE INVENTION

The present invention may solve at least one problem described above.

According to an aspect of the present invention, there is provided an access method that allows quick switching from an operation of recording information into an optical disk to an operation of reproducing information from the optical disk or from an operation of reproduction to an operation of recording.

According to another aspect of the present invention, there is provided an information recording and reproducing apparatus capable of quickly switching from an operation of recording information into an optical disk to an operation of reproducing information from the optical disk or from an operation of reproduction to an operation of recording.

According to a further aspect of the present invention, there is provided a recording medium having a program recorded therein, the program being executable by a control computer of an information recording and reproducing apparatus and allowing quick switching from an operation of recording information into an optical disk to an operation of reproducing information from the optical disk or from an operation of reproduction to an operation of recording.

According to still another aspect of the present invention, there is provided an access method for use when switching from an operation of recording information into an optical disk to an operation of reproducing information from the optical disk or switching from an operation of reproducing to an operation of recording, comprising a calculating step of calculating a rotating speed $n2$ of a motor for rotating the optical disk given that a linear velocity in a first access position after the switching is equal to a linear velocity in a second access position before the switching; a determining step of determining whether the calculated rotating speed $n2$ satisfies a pair of relational expressions $n2>n0$ and $n2>n1$ or a pair of relational expressions $n2<n0$ and $n2<n1$ where $n0$ is a rotating speed of the motor before the switching and $n1$ is a target rotating speed of the motor after the switching; a changing step of changing a control mode from Constant Linear Velocity to Constant Angular Velocity and the rotating speed of the motor from $n0$ to $n1$ if either one of the pairs of relational expressions is determined to be satisfied; and a shifting step of shifting a position to be accessed from the first access position to the second access position after the changing step.

According to this aspect of the present invention, when switching from recording to reproduction or switching from reproduction to recording, the rotating speed $n2$ of the motor for rotating the optical disk is calculated given that the linear velocity in the first access position after the switching is equal to the linear velocity in the second access position before the switching. Then, it is determined whether the calculated rotating speed $n2$ satisfies the pair of relational expressions $n2>n0$ and $n2>n1$ or the pair of relational expressions $n2<n0$ and $n2<n1$ where $n0$ is the rotating speed of the motor before the switching and $n1$ is the target rotating speed of the motor after the switching. If either one of the pairs of relational expressions is determined to be satisfied, a control mode is changed from Constant Linear Velocity to Constant Angular Velocity, and the rotating speed of the motor is changed from $n0$ to $n1$. Then, the position to be accessed is shifted from the first access position to the second access position. In this case, the rotating speed of the motor is changed from $n0$ directly to $n1$ without being changed to rotating speeds other than $n1$ before being changed to $n1$, so that the switching from recording to reproduction or from reproduction to recording can be quickly performed.

According to still another aspect of the present invention, there is provided an information recording and reproducing apparatus capable of recording and reproducing information into and from an optical disk, comprising a motor that rotates the optical disk, an optical pickup device that irradiates a light beam onto the optical disk, a control device, and a processing device that records and reproduces the information into and from the optical disk through the optical pickup device. Upon switching from an operation of recording information into the optical disk to an operation of reproducing information from the optical disk or switching from an operation of reproducing to an operation of recording, the control device calculates a rotating speed n2 of the motor given that a linear velocity in a first access position before the switching is equal to a linear velocity in a second access position after the switching, determines whether the calculated rotating speed n2 satisfies a pair of relational expressions n2>n0 and n2>n1 or a pair of relational expressions n2<n0 and n2<n1 where n0 is a rotating speed of the motor before the switching and n1 is a target rotating speed of the motor after the switching, changes the control mode from Constant Linear Velocity to Constant Angular Velocity and the rotating speed of the motor from n0 to n1 if either one of the pairs of relational expressions is determined to be satisfied, and then moves the optical pickup device from the first access position to the second access position.

According to this aspect of the present invention, when switching from recording to reproduction or switching from reproduction to recording, the control device calculates the rotating speed n2 of the motor given that the linear velocity in the first access position before the switching is equal to the linear velocity in the second access position after the switching, determines whether the calculated rotating speed n2 satisfies the pair of relational expressions n2>n0 and n2>n1 or the pair of relational expressions n2<n0 and n2<n1 where n0 is the rotating speed of the motor before the switching and n1 is the target rotating speed of the motor after the switching, changes the control mode from Constant Linear Velocity to Constant Angular Velocity and the rotating speed of the motor from n0 to n1 if either one of the pairs of relational expressions is determined to be satisfied, and then moves the optical pickup device from the first access position to the second access position. In this case, the rotating speed of the motor is changed from n0 directly to n1 without being changed to rotating speeds other than n1 before being changed to n1, so that the switching from recording to reproduction or from reproduction to recording can be quickly performed.

According to still another aspect of the present invention, there is provided a computer-readable recording medium having a program recorded therein for use in an information recording and reproducing apparatus capable of recording and reproducing information into and from an optical disk when switching from recording to reproduction or from reproduction to recording, the program comprising computer-executable instructions for a calculating process of calculating a rotating speed n2 of a motor for rotating the optical disk given that a linear velocity in a first access position before the switching is equal to a linear velocity in a second access position after the switching, a determining process of determining whether the calculated rotating speed n2 satisfies a pair of relational expressions n2>n0 and n2>n1 or a pair of relational expressions n2<n0 and n2<n1 where n0 is a rotating speed of the motor before the switching and n1 is a target rotating speed of the motor after the switching, a changing process of changing a control mode from Constant Linear Velocity to Constant Angular Velocity and the rotating speed of the motor from n0 to n1 if either one of the pairs of relational expressions is determined to be satisfied, and a moving process of moving an optical pickup device of the information recording and reproducing apparatus from the first access position to the second access position after the changing process.

According to this aspect of the present invention, the program recorded in the above-described recording medium is loaded into a predetermined memory, and a start address of the program is set in a program counter. Then, when switching from recording to reproduction or switching from reproduction to recording, a control computer of the information recording and reproducing apparatus calculates the rotating speed n2 of the motor given that the liner velocity in the first access position before the switching is equal to the linear velocity in the second access position after the switching, determines whether the calculated rotating speed n2 satisfies the pair of relational expressions n2>n0 and n2>n1 or the pair of relational expressions n2<n0 and n2<n1 where n0 is the rotating speed of the motor before the switching and n1 is the target rotating speed of the motor after the switching, changes the control mode from Constant Linear Velocity to Constant Angular Velocity and the rotating speed of the motor from n0 to n1 if either one of the pairs of relational expressions is determined to be satisfied, and then moves the optical pickup device of the information recording and reproducing apparatus from the first access position to the second access position. That is, the above-described access methods can be executed by the control computer of the information recording and reproducing apparatus, so that the switching from recording to reproduction or from reproduction to recording can be quickly performed.

DETAILED DESCRIPTION OF THE PREFERRED EMBODIMENT

Figure 1:
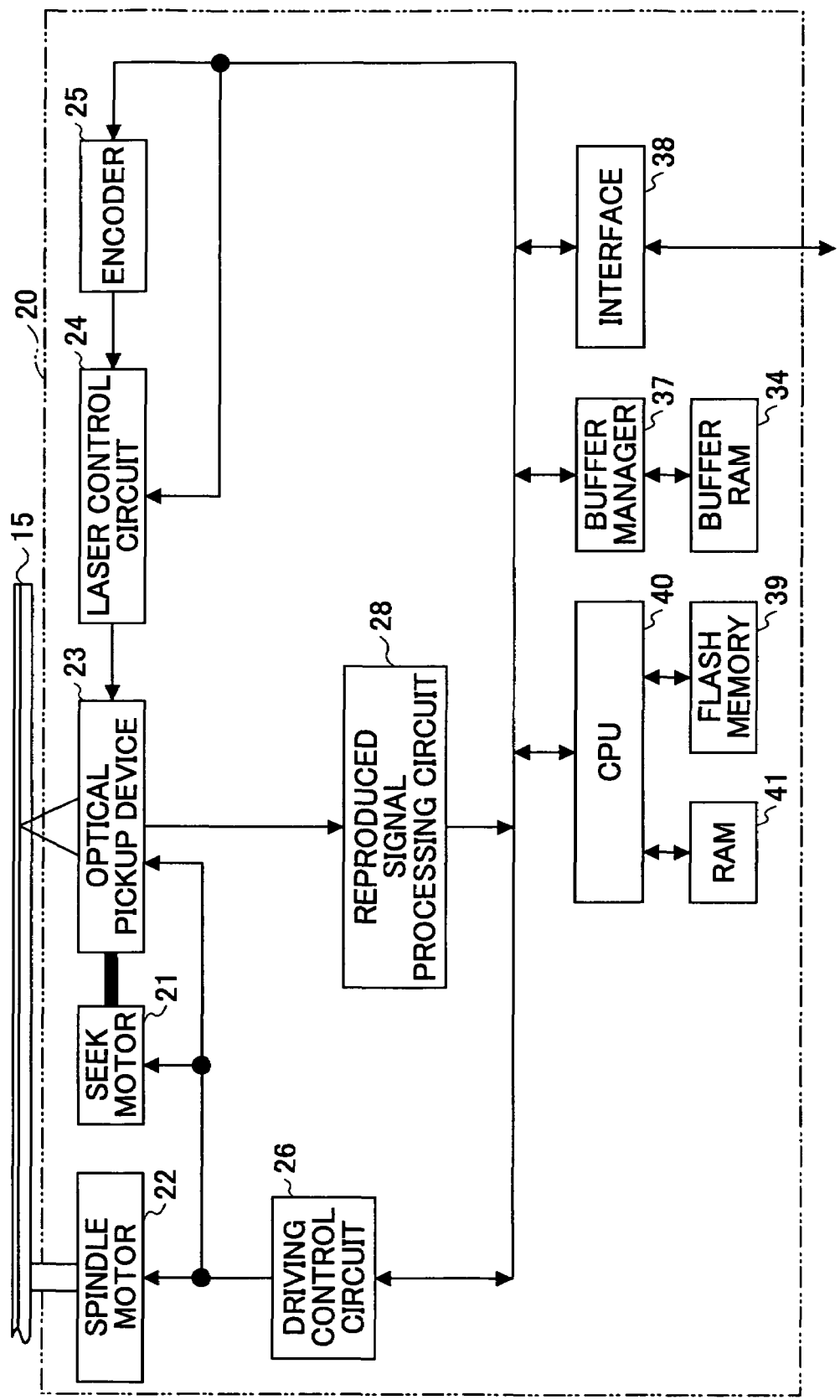
FIG. 1 is a block diagram illustrating the configuration of an optical disk device as an information recording and reproducing apparatus according to an embodiment of the present invention.

The following description provides exemplary embodiments of the present invention with reference to the accompanying drawings. FIG. 1 is a schematic block diagram illustrating the configuration of an optical disk device 20 as an information recording and reproducing apparatus according to an embodiment of the present invention.

The optical disk device 20 illustrated in FIG. 1 comprises a spindle motor 22 that rotates an optical disk 15, an optical pickup device 23, a seek motor 21 that drives the optical pickup device 23, a laser control circuit 24, an encoder 25, a drive control circuit 26, a reproduction signal processing circuit 28, a buffer RAM 34, a buffer manager 37, an interface 38, a flash memory 39, a CPU 40, and a RAM 41. It is to be noted that arrows shown in FIG. 1 indicate general flow of signals and information, but do not indicate all the connections between the components. The optical disk 15 used in this embodiment is, for example, an information recording medium compliant with the DVD+R standard.

The optical pickup apparatus 23 is adapted to focus laser beams onto a recording surface of the optical disk 15 and to receive light beams reflected by the recording surface. Although not shown in the drawings, the optical pickup device 23 comprises a semiconductor laser that irradiates laser beams having wavelengths corresponding to the optical disk 15, an objective lens that focuses the light beams irradiated from the semiconductor laser onto the recording surface of the optical disk 15, a light receiver that receives returning light beams reflected by the recording surface, and a drive system (a focusing actuator and a tracking actuator) that drives the objective lens. The light receiver includes plural light receiving elements (or light receiving areas) and outputs signals (photoelectric conversion signals) corresponding to the amount of the light beams received by the light receiving elements (or the light receiving areas) to the reproduction signal processing circuit 28.

The reproduction signal processing circuit 28 obtains servo signals (focus error signals, tracking error signals, etc.), address information, synchronizing signals, and RF signals according to the signals (plural photoelectric conversion signals) output from the light receiver using a method known in the art. The obtained servo signals are output to the drive control circuit 26 and the CPU 40. The address information and the RF signals are output to the CPU 40. The synchronizing signals are output to the encoder 25, the drive control circuit 26, and so on. The reproduction signal processing circuit 28 decodes the RF signals and detect errors of the RF signals. Then, the reproduction signal processing circuit 28 loads the RF signals as reproduced data into the buffer RAM 34 via the buffer manager 37 after correcting the errors if any.

The drive control circuit 26 generates drive signals for driving the tracking actuator according to the tracking error signals output from the reproduction signal processing circuit 28 so as to correct misalignment of the objective lens in the tracking direction. The drive control circuit 26 also generates drive signals for driving the focusing actuator according to the focus error signals output from the reproduction signal processing circuit 28 so as to correct focus misalignment of the objective lens. The drive signals for driving the tracking and focusing actuators generated by the drive control circuit 26 are output to the optical pickup device 23. Thus, tracking control and focus control are performed. Further, the drive control circuit 26 generates drive signals for driving the seek motor 21 and drive signals for driving the spindle motor 22 according to instructions from the CPU 40. The drive signals for driving the seek motor 21 and the drive signals for driving the spindle motor 22 are output to the seek motor 21 and the spindle motor 22, respectively. In addition, the drive control circuit 26 reports the rotating speed of the spindle motor 22.

The buffer RAM 34 temporarily holds recording data (data to be recorded in the optical disk 15) and reproduced data (data reproduced from the optical disk 15). Data input to and output from the buffer RAM 34, which are performed based on FIFO (First-In First-Out), are managed by the buffer manager 37. FIFO is a method for outputting data items in the same order that the data items are input.

The encoder 25 takes out the recording data held in the buffer RAM 34 via the buffer manager 37 according to an instruction from the CPU 40, and generates write signals for the recording data to be written in the optical disk 15 by modulating the recording data and adding error correction codes. The generated write signals are output to the laser control circuit 24.

The laser control circuit 24 controls light emitting power of the semiconductor laser. For example, the laser control circuit 24 generates drive signals for driving the semiconductor laser in accordance with the write signals, recording conditions, and light emitting properties of the semiconductor laser when recording is performed.

The interface 38 is compatible with standard interfaces such as ATAPI (AT Attachment Packet Interface), SCSI (Small Computer System Interface), and USB (Universal Serial Bus).

The flash memory 39 stores various programs written in codes readable by the CPU 40, recording conditions such as recording power and recording strategy information, and the light emitting properties of the semiconductor laser.

The CPU 40 controls operations of the optical disk device 20 according to the programs stored in the flash memory 39, and loads data necessary for the control operations into the RAM 41 and the buffer RAM 34.

Figure 2:
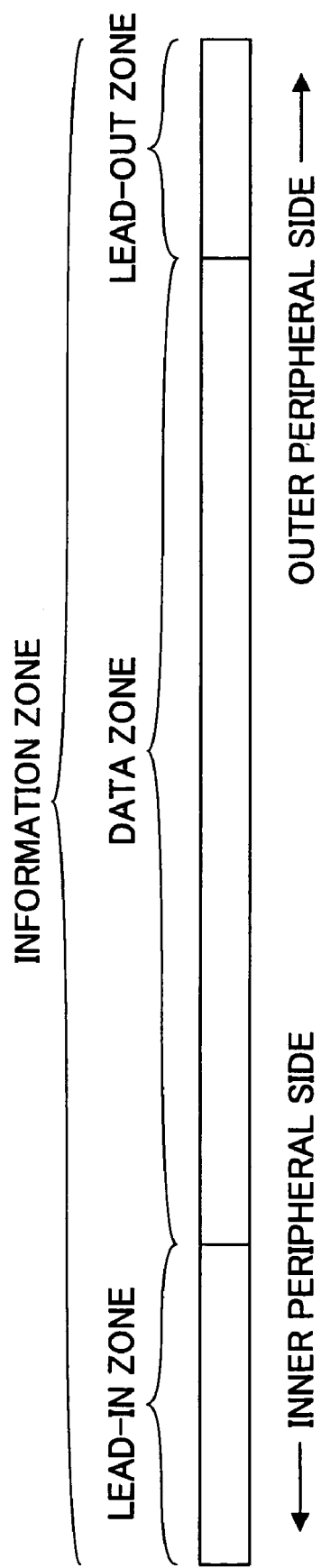
FIG. 2 is a schematic diagram illustrating an information zone of an optical disk.

The optical disk 15 includes an information zone, which is divided into three sub-zones of a lead-in zone, a data zone, and a lead-out zone in this order from the inner peripheral side toward the outer peripheral side of the optical disk 15, i.e. in the direction of increasing the address number, as generally shown in FIG. 2 (see ECMA-349).

Figure 3:
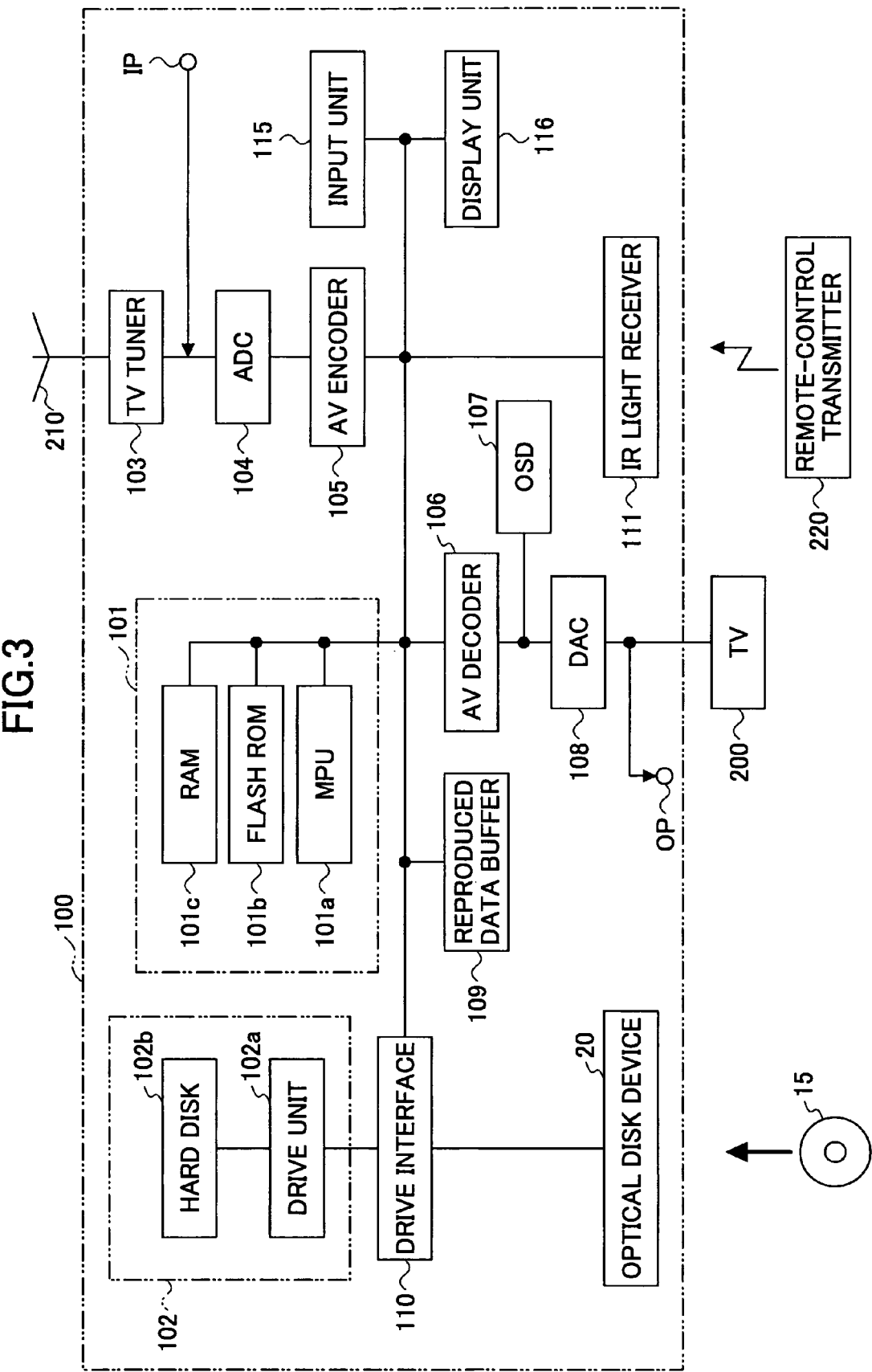
FIG. 3 is a schematic block diagram illustrating the configuration of a DVD recorder equipped with the optical disk device of FIG. 1.

FIG. 3 is a schematic block diagram illustrating the configuration of a DVD recorder 100 equipped with the above-described optical disk device 20. It is to be noted that lines interconnecting components of the DVD recorder 100 shown in FIG. 3 indicate general flow of signals and information, but do not indicate all the connections between the components.

The DVD recorder 100 shown in FIG. 3 comprises, in addition to the optical disk device 20, a main controller 101, a hard disk device 102, a TV tuner 103, an AD converter (ADC) 104, an AV encoder 105, an AV decoder 106, an on-screen display (OSD) 107, a DA converter (DAC) 108, a reproduced data buffer 109, a drive interface 110, an IR light receiver 111, an input unit 115, and a display unit 116.

The main controller 101 comprises a micro processing unit (MPU) 101a, a flash ROM 101b, and a RAM 101c. The flash ROM 101b stores a boot program, etc., written in codes readable by the MPU 101a. The boot program is executed first when the DVD recorder 100 is powered on. The MPU 101a performs checking operations, retrieves various information, and performs initial setting operations according to the boot program. The RAM 101c holds programs written in codes readable by the MPU 101a, various data items to be used for processing operations in the MPU 101a, and various data items produced by processing operations in the MPU 101a. In other words, the MPU 101a controls the DVD recorder 100 according to the programs held in the flash ROM 101b and the RAM 101c.

The hard disk device 102 comprises a hard disk 102b and a drive unit 102a that drives the hard disk 102b. The hard disk 102b stores the programs written in codes readable by the MPU 101a, the various data items to be used for processing operations in the MPU 101a. The programs stored in the hard disk 102b are loaded into the RAM 101c when needed and executed by the MPU 101a. The various data items stored in the hard disk 102b are transmitted to the RAM 101c when needed.

The drive interface 110 is connected to the interface 38 of the optical disk device 20, and is compatible with the same standard interfaces as the interface 38.

The TV tuner 103 receives broadcasts via an antenna 210.

The ADC 104 converts signals, such as video signals and audio signals, output from the TV tuner 103 from analog to digital. The ADC 104 can also receive signals output from, for example, a video camera via an external input terminal IP.

The AV encoder 105 compresses the signals, such as video signals and audio signals, output from the ADC 104 to generate recording data. The recording data are stored in the optical disk 15 or the hard disk 102b via the drive interface 110.

The reproduced data buffer 109 temporarily holds reproduced data (data reproduced from the optical disk 15 or the hard disk 102b). The reproduced data are input to and output from the reproduced data buffer 109 based on FIFO.

The AV decoder 106 takes out the reproduced data held in the reproduced data buffer 109 and decompresses the reproduced data.

The OSD 107 comprises a character generator (not shown) for displaying characters and images on a screen of the television (TV) set 200.

The DAC 108 converts signals output from the AV decoder 106 and the OSD 107 from digital-to analog. Signals output from the DAC 108 are sent to the TV set 200. The signals output from the DAC 108 may be sent to monitors other than a monitor of the TV set 200 via an external output terminal OP.

The IR light receiver 111 receives light signals from a remote-control transmitter 220 and reports the reception of the signals to the MPU 101a.

The input unit 115 comprises an input medium (not shown) such as a control panel and reports various information input by users to the MPU 101a.

The display unit 116 comprises a display section (not shown) of, for example, LCD (Liquid Crystal Display), and displays various information specified by the MPU 101a.

The DVD recorder 100 has a time shift function that allows reproducing content from the beginning while the content is being recorded into the optical disk 15.

The following describes operations performed by the DVD recorder 100 when timer recording of a broadcast program into the optical disk 15 is set by a user with use of the input unit 115 or the remote-control transmitter 220 and the time shift function of the DVD recorder 100 is on.

When the scheduled start time of the timer recording comes, the MPU 101a issues to the optical disk device 20 a recording command in which the top of the data zone is specified as a recording start position. The recording data generated by the AV encoder 105 are output into the optical disk device 20 via the drive interface 110. The recording data are sequentially provided as stream data to the optical disk device 20 until the scheduled end time of the timer recording comes.

Figure 4:
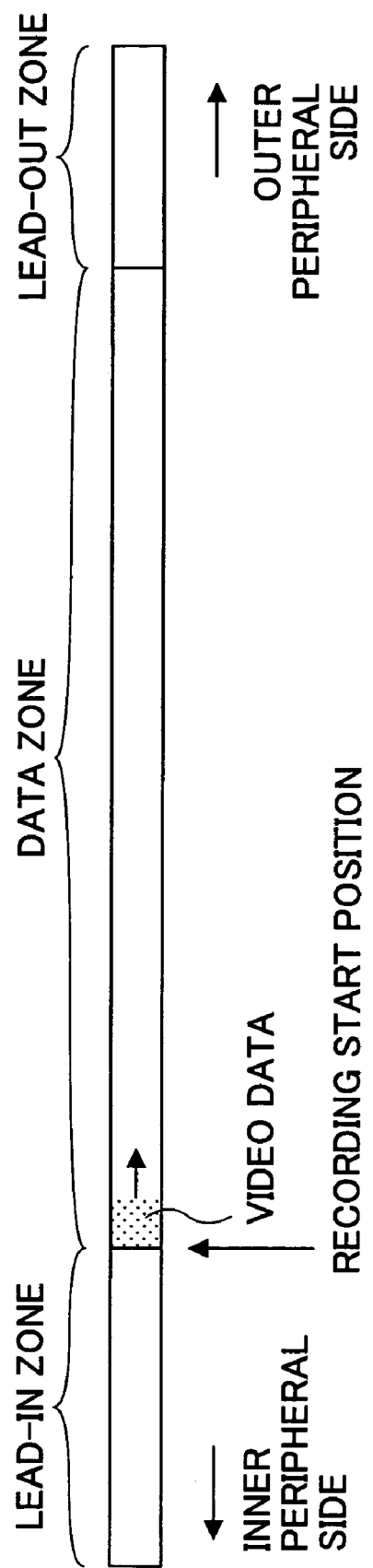
FIG. 4 is a schematic diagram illustrating a zone in which video data are recorded.
Figure 5:
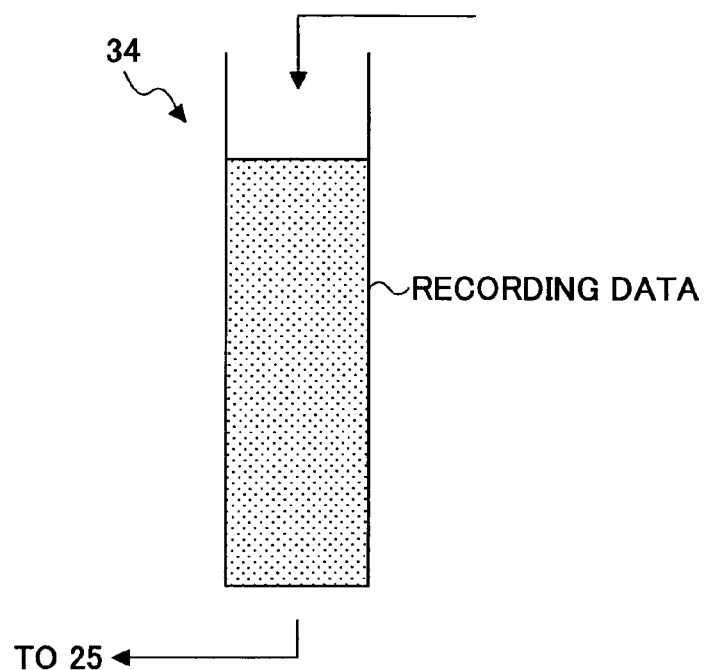
FIG. 5 illustrates recording data held in a buffer RAM during recording.

On receiving the recording command, the CPU 40 reports the reception of the recording command to the reproduction signal processing circuit 28 and outputs information about the recording conditions to the laser control circuit 24. Thus, clock signals for recording operations are generated by the reproduction signal processing circuit 28, and data defining pulse forms and light emitting power are stored in a register (not shown) of the laser control circuit 24. The CPU 40 issues an instruction to the buffer manager 37 to load the recording data into the buffer RAM 34. When the volume of the recording data held in the buffer RAM 34 reaches a predetermined volume, recording into the optical disk 15 via the encoder 25, the laser control circuit 24, and the optical pickup device 23 is started. As shown in FIG. 4, for example, the recording data are sequentially recorded as video data from the top of the data zone of the optical disk 15. In the example shown in FIG. 5, the speed of loading the recording data into the buffer RAM 34 is substantially balanced with the speed of taking out the data from the buffer RAM 34. Accordingly, the volume of the recording data held in the buffer RAM 34 remains substantially constant even with the progress of the recording.

The MPU 101a issues to the optical disk device 20 a command to increase the recording speed when a predetermined time has passed since the recording had started.

Figure 6:
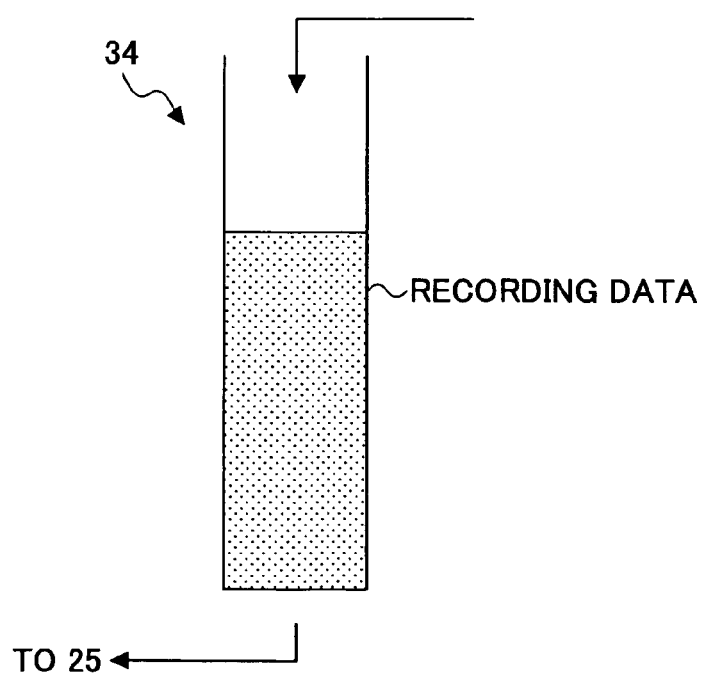
FIG. 6 illustrates recording data held in a buffer RAM when the recording speed is increased.

On receiving the command to increase the recording speed, the CPU 40 reports the reception of the command to the reproduction signal processing circuit 28. Thus, the period of the clock signal is shortened. Accordingly, the speed of taking out the recording data from the buffer RAM 34 becomes faster than the speed of loading the recording data into the buffer RAM 34. The volume of the recording data held in the buffer RAM 34 therefore gradually decreases as shown in the example of FIG. 6.

Figure 7:
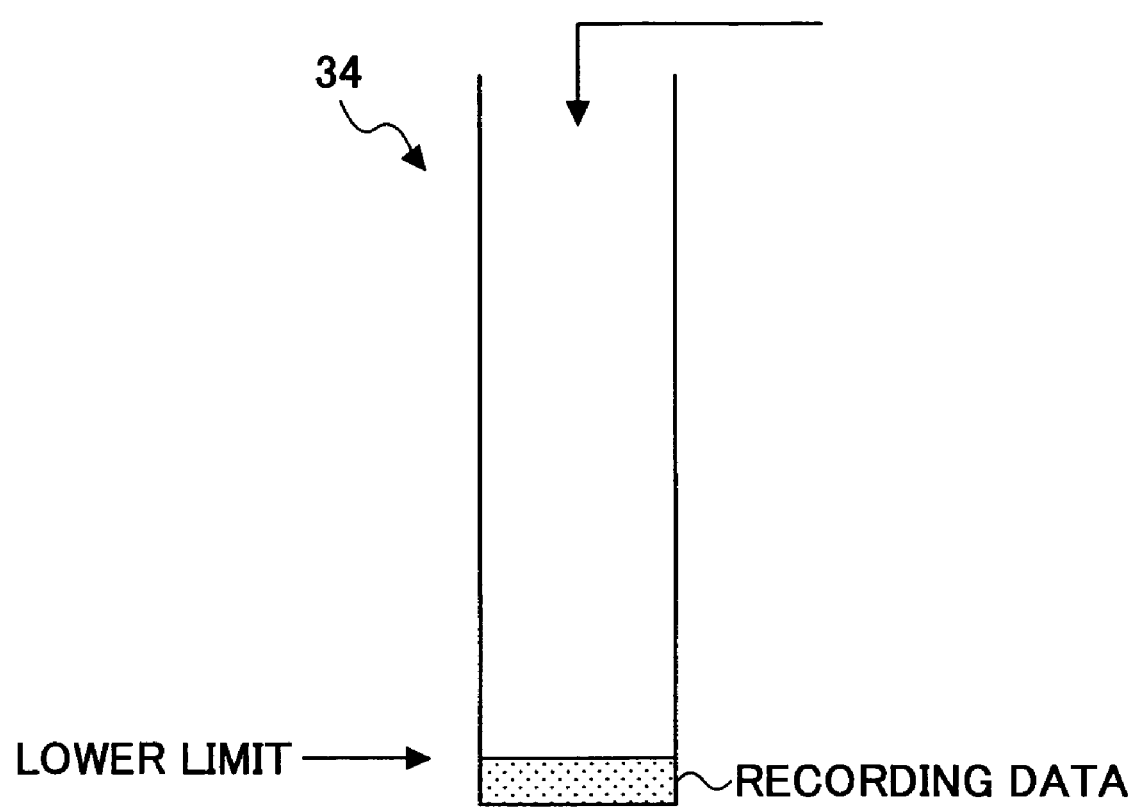
FIG. 7 illustrates recording data held in a buffer RAM when switching from recording to reproduction.
Figure 8:
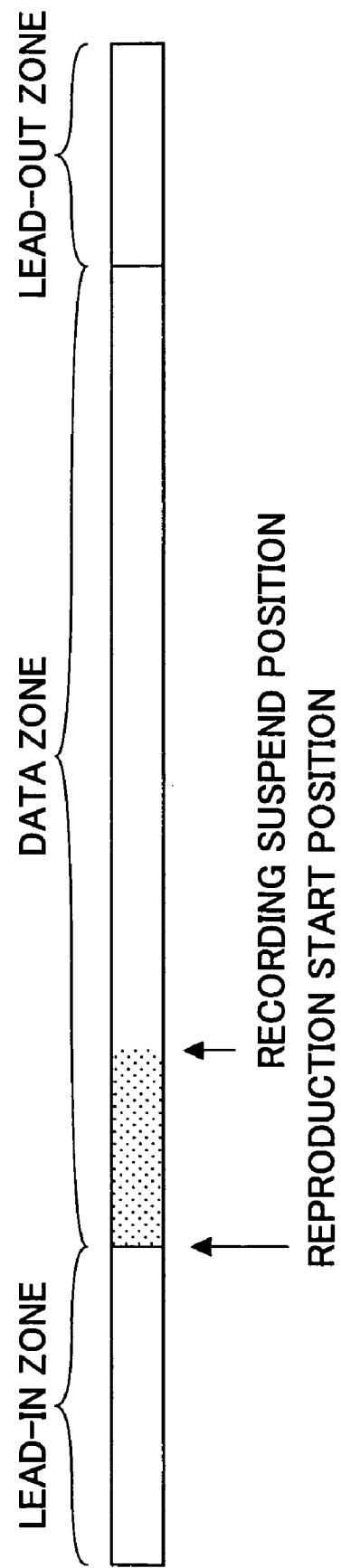
FIG. 8 shows a recording suspend position and a reproduction start position when switching from recording to reproduction.

The MPU 101a issues to the optical disk device 20 a reproduction command in which the top of the video data is specified as a reproduction start position when a predetermined time has passed since the recording speed had increased. This predetermined time is the time required for the volume of the recording data held in the buffer RAM 34 to reach a lower limit shown in FIG. 7, for example, and is set in advance.

On receiving the reproduction command, the CPU 40 suspends the recording and reproduces the video data from the reproduction start position specified by the reproduction command so as to load the video data into the buffer RAM 34. Then, the video data are output to the MPU 101a on a sector-by-sector basis.

Figure 9:
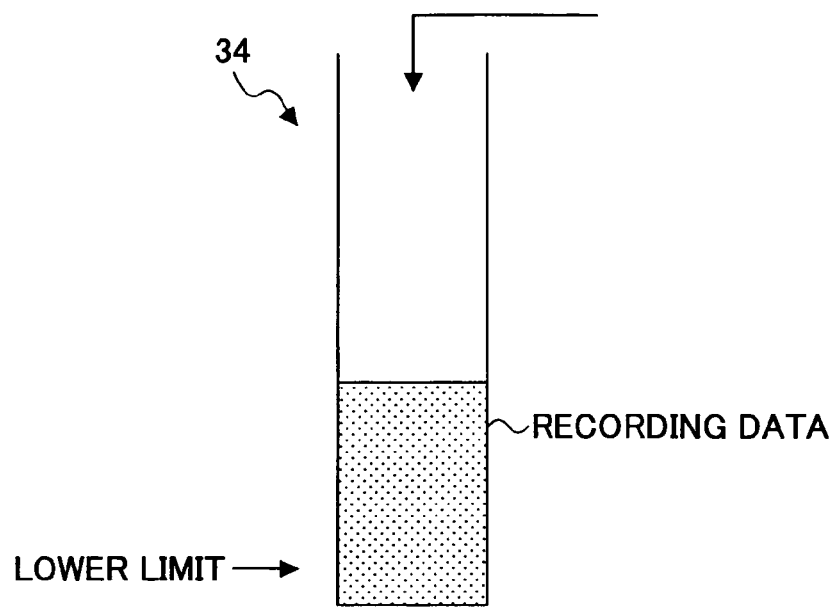
FIG. 9 illustrates recording data held in a buffer RAM during reproduction.
Figure 10:
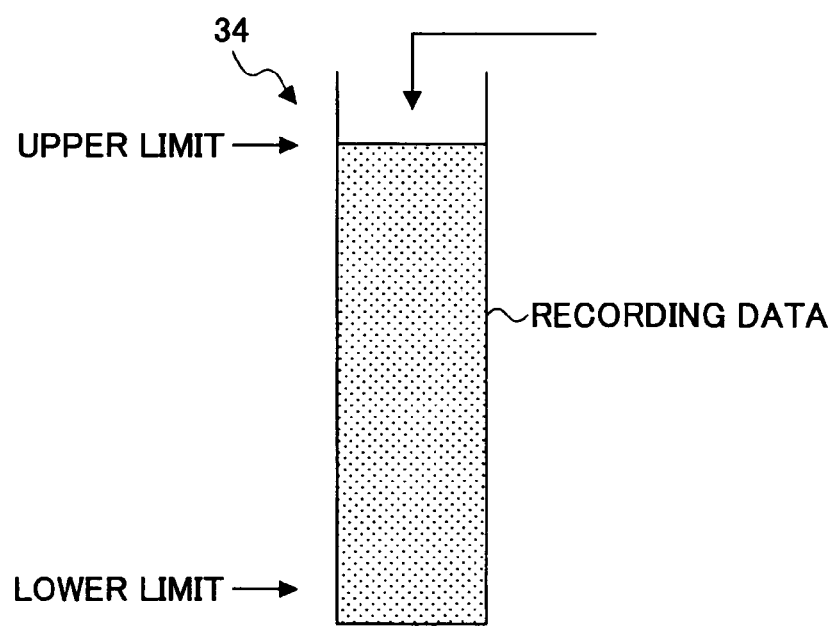
FIG. 10 illustrates recording data held in a buffer RAM when switching from reproduction to recording.

The recording data are not taken out during the reproduction although the recording data are loaded into the buffer RAM 34. Therefore, the volume of the recording data held in the buffer RAM 34 gradually increases as shown in FIG. 9, for example. In view of this, the volume of the data to be reproduced is specified by the reproduction command, which is set to the volume that can be reproduced before the volume of the recording data held in the buffer RAM 34 substantially reaches an upper limit shown in FIG. 10, for example, during the suspension of the recording.

The MPU 101a sequentially loads the reproduced data from the optical disk device 20 to the reproduced data buffer 109. The reproduced data loaded in the reproduced data buffer 109 are displayed on the TV set 200 via the AV decoder 106 and the DAC 108 as mentioned earlier.

When the reproduction is completed, the CPU 40 reports the completion of the reproduction to the MPU 101a.

On receiving the report of the reproduction completion, the MPU 101a issues to the optical disk device 20 a request command for a recording start position.

Figure 11:
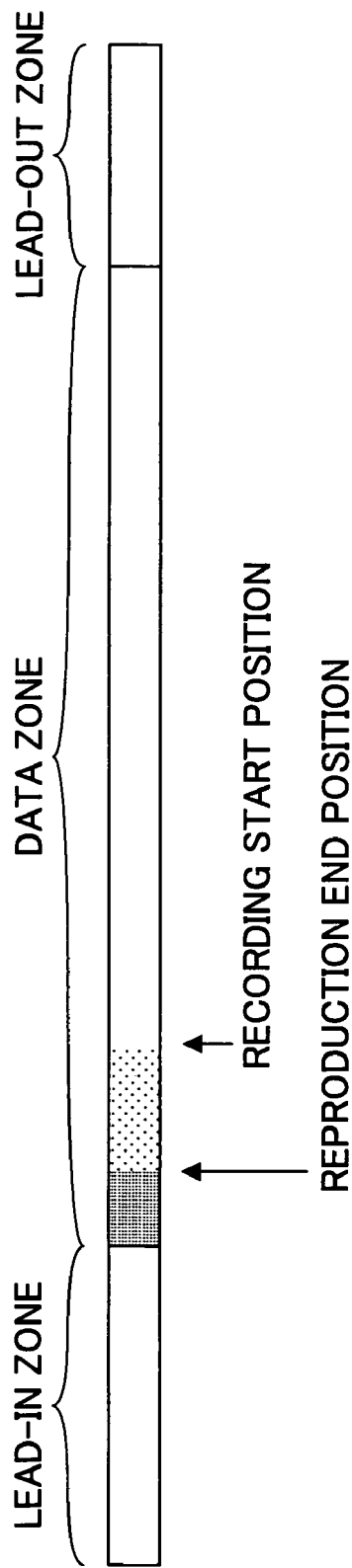
FIG. 11 shows a reproduction end position and a recording start position when switching from reproduction to recording (continued from FIG. 8)

On receiving the request command that request the recording start position, the CPU 40 reports the address following an end address of the recorded video data as shown in FIG. 11, for example.

The MPU 101a issues to the optical disk device 20 a recording command in which the reported recording start position is set.

On receiving the recording command, the CPU 40 starts recording the recording data from the specified recording start position. As the recording data have been continuously loaded into the buffer RAM 34 even during the reproducing, recording data held in the buffer RAM 34 are recorded following the previously recorded data. Therefor, the timer-recorded program is recorded without missing any part of the program. Meanwhile, the reproduced data are held in the reproduced data buffer 109 so as to continuously display images even during the recording. In an alternative embodiment, the buffer RAM 34 may have a larger capacity to allow output of the reproduced data from the buffer RAM 34 to the MPU 101a during recording operations.

The MPU 101a issues to the optical disk device 20 a reproduction command in which the position following the end position of the previously reproduced video data is specified as a reproduction start position when a predetermined time has passed since the recording has been restarted. The volume of the data to be reproduced specified in this reproduction command is equal to the volume of the data to be reproduced specified in the previous reproduction command.

Figure 12:
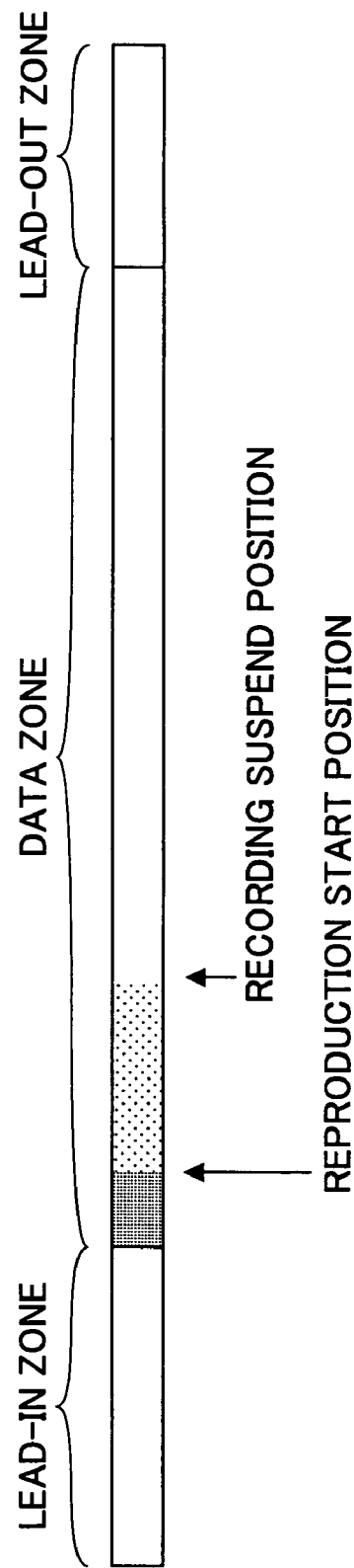
FIG. 12 shows a recording suspend position and a reproduction start position when switching from recording to reproduction (continued from FIG. 11)

On receiving the reproduction command, the CPU 40 suspends the recording and reproduces the video data of the specified volume from the reproduction start position specified by the reproduction command shown in FIG. 12, for example.

Recording and reproduction are alternately performed until the scheduled end time of the timer recording comes.

In this embodiment, the time of one recording operation, the time of one reproduction operation, the recording speed, and the reproduction speed are set based on the capacity of the reproduced data buffer 109 and the capacity of the buffer RAM 34 such that the timer recorded program is recorded without missing any part of the program, and images are continuously displayed even during recording.

Figure 13:
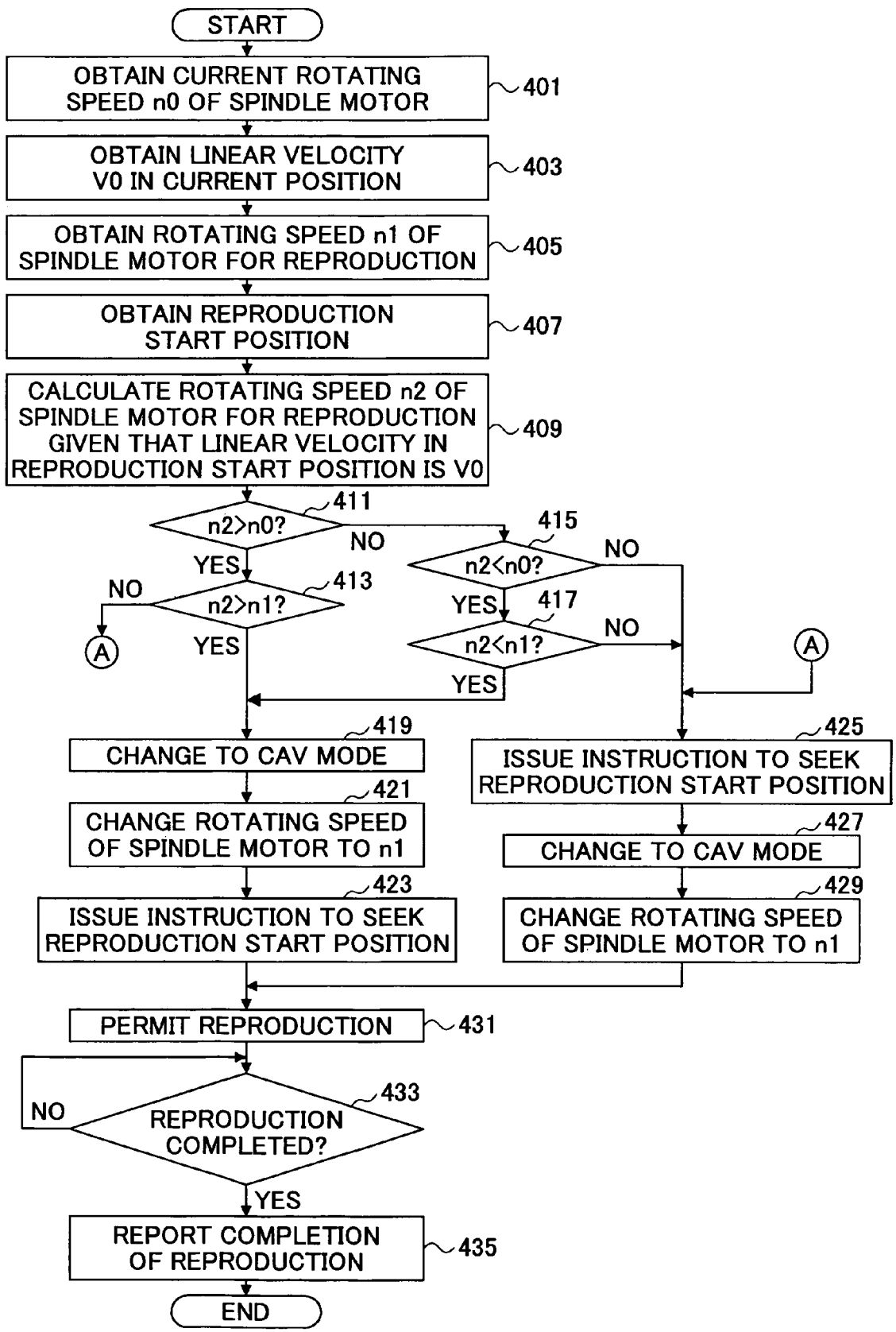
FIG. 13 is a flowchart illustrating a reproduction process performed by an optical disk device.

The following describes operations (reproduction process) performed by the optical disk device 20 when switching from recording to reproduction with reference to FIG. 13. The flowchart shown in FIG. 13 corresponds to a series of operational algorithms executed by the CPU 40. When a reproduction command is received, a start address of a program (hereinafter referred to as "reproduction process program") corresponding to the flowchart of FIG. 13 stored in the flash memory 39 is set in a program counter (not shown) of the CPU 40, so that the reproduction process is started.

Figure 14:
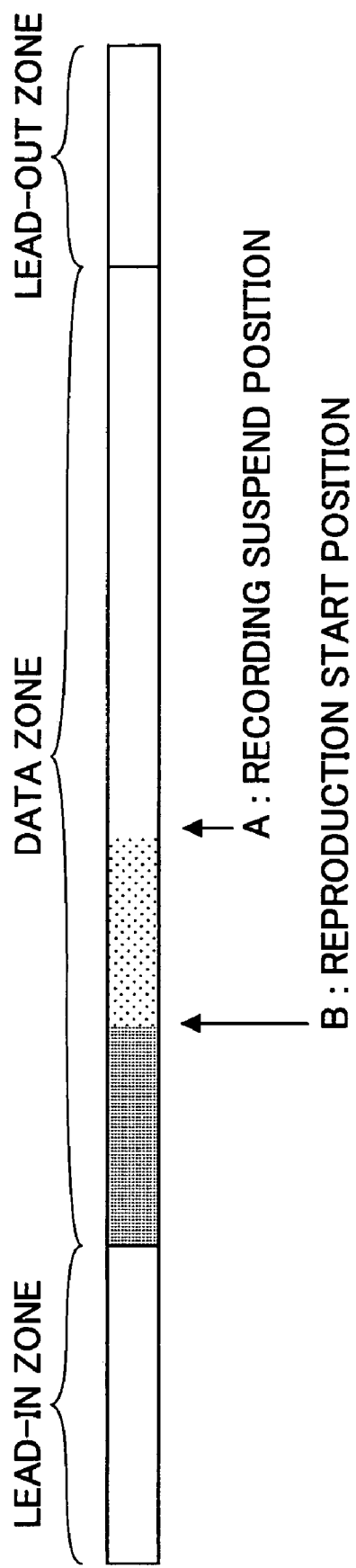
FIG. 14 shows a reproduction start position and a recording suspend position at a step of the reproduction process of FIG. 13.

In this embodiment, a recording suspend position and a recording start position are set to a position A and a position B, respectively, as shown in FIG. 14, for example. The optical pickup device 23 is positioned such that the laser beam is irradiated onto the position A. In this embodiment, recording is performed in CLV (Constant Linear Velocity) mode, and reproduction is performed in CAV (Constant Linear Velocity) mode.

First, in Step 401, a current rotating speed n0 of the spindle motor 22 is obtained via the drive control circuit 26.

Then in Step 403, the linear velocity V0 in the current position (position A in this embodiment) is obtained.

Then in Step 405, a rotating speed n1 of the spindle motor 22 for reproduction is obtained.

Then in Step 407, a reproduction start position (position B in this embodiment) is obtained.

Then in step 409, a rotating speed n2 of the spindle motor 22 is calculated given that the linear velocity in the reproduction start position is V0.

Then in step 411, the CPU 40 determines whether n2>n0. If Yes, i.e., n2>n0 is satisfied, the processing proceeds to Step 413.

Then in step 413, the CPU 40 determines whether n2>n1. If Yes, i.e., n2>n1 is satisfied, the processing proceeds to Step 419.

In Step 419, the control mode of the spindle motor 22 is changed to CAV mode.

Then in Step 421, the CPU 40 issues an instruction to the drive control circuit 26 to change the rotating speed of the spindle motor 22 to n1.

Then in Step 423, the CPU 40 issues an instruction to the drive control circuit 26 to cause the optical pickup device 23 to seek the reproduction start position.

Then in step 431, the CPU 40 refers to address information provided from the reproduction signal processing circuit 28, and permits reproduction when the optical pickup device 23 is confirmed to be positioned in a location corresponding to the reproduction start position. Thus, the reproduction signal processing circuit 28 reproduces video data, and the reproduced data continue to be loaded into the buffer RAM 34 and then output into the reproduced data buffer 109 on a sector-by-sector basis.

Then in step 433, the CPU 40 determines whether the reproduction is completed. If No, i.e., the reproduction is not completed, the CPU 40 determines again whether the reproduction is completed after a predetermined time has passed. If Yes, i.e., the reproduction is completed, the processing proceeds to Step 435.

In Step 435, the completion of the reproduction is reported to the MPU 101a. Then, the reproduction process is ended.

In the above-described reproduction process, if No, i.e., n2>n1 is not satisfied, in Step 413, the processing proceeds to Step 425.

Then in Step 425, the CPU 40 issues an instruction to the drive control circuit 26 to cause the optical pickup device 23 to seek the reproduction start position.

Then in Step 427, the control mode of the spindle motor 22 is changed to CAV mode.

Then in Step 429, the CPU 40 issues an instruction to the drive control circuit 26 to change the rotating speed of the spindle motor 22 to n1. Then the processing proceeds to Step 431.

In the above-described reproduction process, if No, i.e., n2>n0 is not satisfied, in Step 411, the processing proceeds to Step 415.

In step 415, the CPU 40 determines whether n2<n0. If Yes, i.e., n2<n0 is satisfied, the processing proceeds to Step 417.

In step 417, the CPU 40 determines whether n2<n1. If Yes, i.e., n2<n1 is satisfied, the processing proceeds to Step 419. If No, i.e., n2<n1 is not satisfied, the processing proceeds to Step 425.

In the above-described reproduction process, if No, i.e., n2<n0 is not satisfied, in Step 415, the processing proceeds to Step 425.

Figure 15:
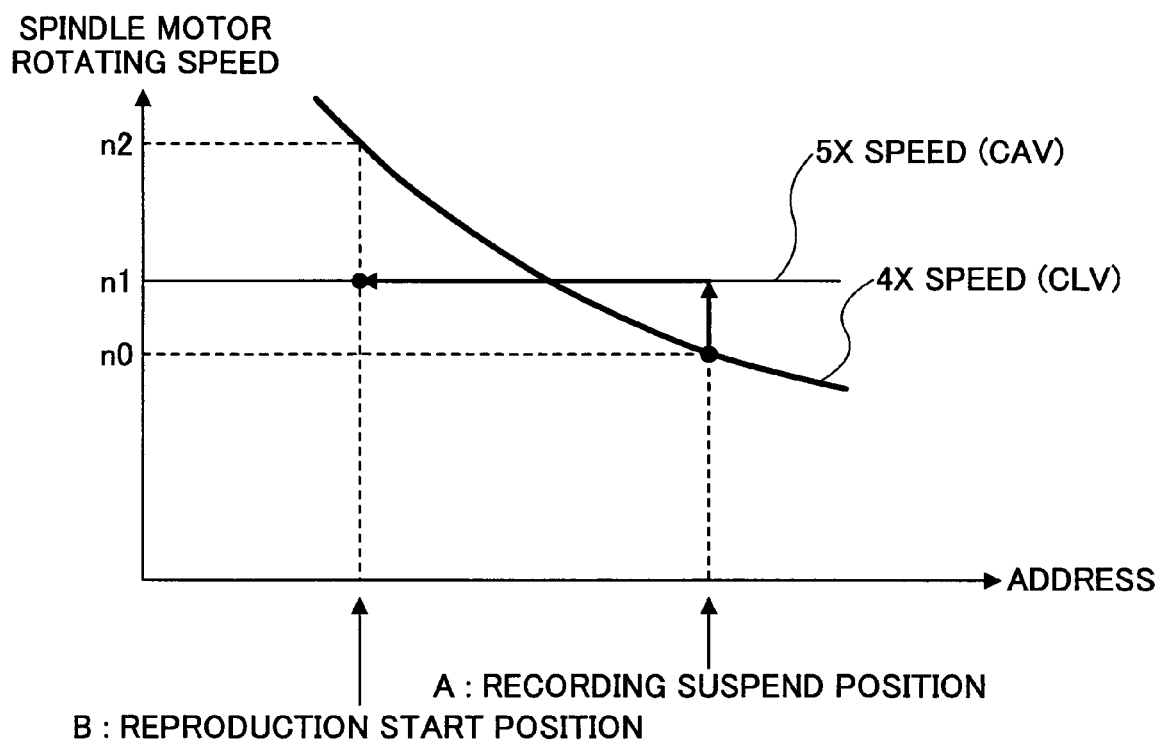
FIG. 15 shows a chart illustrating a relationship between the rotating speed of the spindle motor and the address.

In short, if n2>n0 and n2>n1 are satisfied as shown in FIG. 15, for example, the rotating speed of the spindle motor 22 is changed to n1 before seeking the reproduction start position. Also, if n2<n0 and n2<n1 are satisfied, the rotating speed of the spindle motor 22 is changed to n1 before seeking the reproduction start position.

As can be understood from the above description, in the optical disk device 20 of this embodiment, the laser control circuit 24, the encoder 25, and the reproduction signal processing circuit 28 form a processing device. Further, the CPU 40 and the programs executed by the CPU 40 form a control device. In other words, the control device is realized with Steps 401 through 423. At least a part or all of the control device realized by the programs executed by the CPU 40 may be configured as hardware.

In this embodiment, a program relevant to the present invention is executed by the reproduction process program among the programs recorded in the flash memory 39 as a recording medium. Specifically, a calculating process is performed by a program corresponding to the operation of Step 409, and a determining process is performed by a program corresponding to the operations of Steps 411 through 417. Further, a changing process is performed by a program corresponding to the operations of Steps 419 and 421, and a moving process is performed by a program corresponding to the operation of Step 423.

In connection with an access method according to an aspect of the present invention, a calculating step is performed by the operation of Step 409 of FIG. 13, and a determining step is performed by the operations of Steps 411 through 417. Further, a changing step is performed by the operations of Steps 419 and 421, and a shifting step is performed by the operation of Step 423.

As descried above, the optical disk device 20 of this embodiment is configured such that, upon switching from recording to reproduction, the current rotating speed n0 of the spindle motor 22 and the rotating speed n1 of the spindle motor 22 for reproduction are obtained before seeking the reproduction start position (i.e., before shifting the position to be accessed). Then, the rotating speed n2 of the spindle motor 22 is calculated given that the linear velocity in the reproduction start position (a second access position) is equal to the linear velocity in the recording suspend position (a first access position). If n2>n0 and n2>n1 are satisfied, or if n2<n0 and n2<n1 are satisfied, the control mode of the spindle motor 22 is changed to CAV mode and the rotating speed of the spindle motor 22 is changed to n1 before the seeking. Thus, the rotating speed of the spindle motor 22 is changed from n0 directly to n1 without being changed to rotating speeds other than n1 before being changed to n1, so that the switching from recording to reproduction can be quickly performed. Accordingly, the time shift function can be provided without the need for increasing the capacity of the buffer RAM 34 and the capacity of the reproduced data buffer 109.

Figure 16:
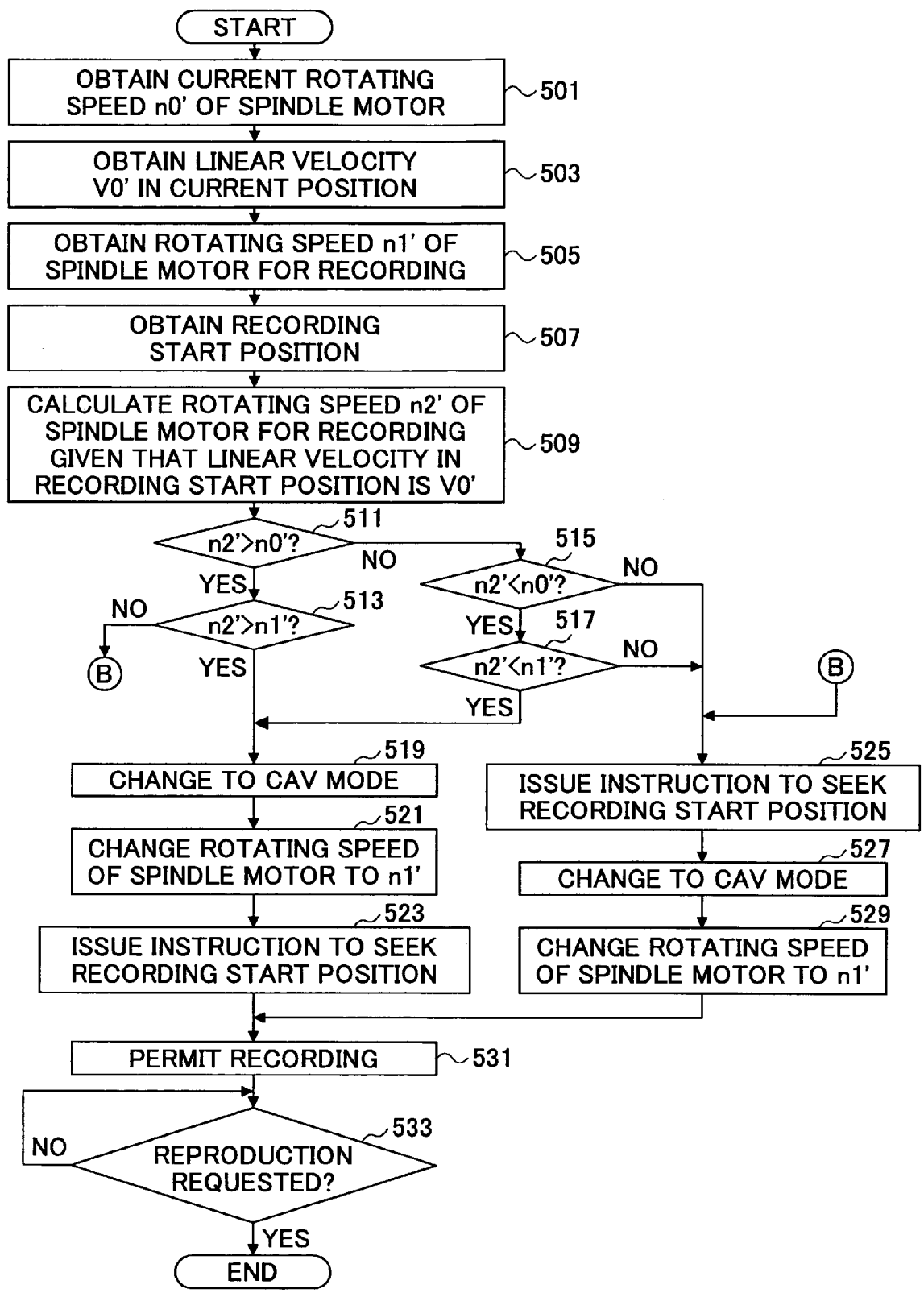
FIG. 16 is a flowchart illustrating a recording process performed by an optical disk device in which recording is performed in CAV mode and reproduction is performed in CLV mode.

While recording is performed in CLV mode and reproduction is performed in CAV mode in the illustrated embodiment, recording may be performed in CAV mode and reproduction may be performed in CLV mode. In such a case, operations (recording process) shown in FIG. 16 are performed upon switching from reproduction to recording, wherein a reproduction end position is a first access position and the recording start position is a second access position. The flowchart shown in FIG. 16 is similar to the flowchart shown in FIG. 13, except that "reproduction" of FIG. 13 is replaced by the "recording".

First, in Step 501, a current rotating speed n0' of the spindle motor 22 is obtained via the drive control circuit 26.

Then in Step 503, the linear velocity V0' in the current position (the reproduction end position in this embodiment) is obtained.

Then in Step 505, a rotating speed n1' of the spindle motor 22 for recording is obtained.

Then in Step 507, the recording start position is obtained.

Then in step 509, a rotating speed n2' of the spindle motor 22 is calculated given that the linear velocity in the recording start position is V0'.

Then in step 511, the CPU 40 determines whether n2'>n0'. If Yes, i.e., n2'>n0' is satisfied, the processing proceeds to Step 513.

Then in step 513, the CPU 40 determines whether n2'>n1'. If Yes, i.e., n2'>n1' is satisfied, the processing proceeds to Step 519.

In Step 519, the control mode of the spindle motor 22 is changed to CAV mode.

Then in Step 521, the CPU 40 issues an instruction to the drive control circuit 26 to change the rotating speed of the spindle motor 22 to n1'.

Then in Step 523, the CPU 40 issues an instruction to the drive control circuit 26 to cause the optical pickup device 23 to seek the recording start position.

Then in step 531, the CPU 40 refers to address information provided from the reproduction signal processing circuit 28, and permits recording when the optical pickup device 23 is confirmed to be positioned in a location corresponding to the recording start position. Thus, recording is performed with use of the optical pickup device 23, the laser control circuit 24, and the encoder 25. The recording continues until the CPU 40 receives a reproduction command. In step 533, the CPU determines whether the reproduction command is received. If Yes, the recording is terminated (suspended). Also, if a recording termination request is received, the recording is terminated.

In the above-described recording process, if No, i.e., n2'>n1' is not satisfied, in step 513, the processing proceeds to Step 525.

Then in Step 525, the CPU 40 issues an instruction to the drive control circuit 26 to cause the optical pickup device 23 to seek the recording start position.

Then in Step 527, the control mode of the spindle motor 22 is changed to CAV mode.

Then in Step 529, the CPU 40 issues an instruction to the drive control circuit 26 to change the rotating speed of the spindle motor 22 to n1'. Then the processing proceeds to Step 531.

In the above-described reproduction process, if No, i.e., n2'>n0' is not satisfied, in Step 511, the processing proceeds to Step 515.

In step 515, the CPU 40 determines whether n2'<n0'. If Yes, i.e., n2'<n0' is satisfied, the processing proceeds to Step 517.

In step 517, the CPU 40 determines whether n2'<n1'. If Yes, i.e., n2'<n1' is satisfied, the processing proceeds to Step 519. If No, i.e., n2'<n1' is not satisfied, the processing proceeds to Step 525.

In the above-described reproduction process, if No, i.e., n2'<n0' is not satisfied, in Step 515, the processing proceeds to Step 525.

In short, if n2'>n0' and n2'>n1' are satisfied, the rotating speed of the spindle motor 22 is changed to n1' before seeking the recording start position. Also, if n2'<n0' and n2'<n1' are satisfied, the rotating speed of the spindle motor 22 is changed to n1' before seeking the recording start position.

In this embodiment, a program relevant to the present invention is executed by the program (hereinafter referred to as "recording process program") corresponding to the flowchart shown in FIG. 16. Specifically, a calculating process is performed by a program corresponding to the operation of Step 509, and a determining process is performed by a program corresponding to the operations of Steps 511 through 517. Further, a changing process is performed by a program corresponding to operations of Steps 519 and 521. This embodiment can achieve the same effects as the above-described embodiment.

In connection with the access method according to an aspect of the present invention, a calculating step is performed by the operation of Step 509 of FIG. 16, and a determining step is performed by the operations of Steps 511 through 517. Further, a changing step is performed by operations of Steps 519 and 521.

While reproduction is performed in CAV mode in the first embodiment, reproduction may be performed selectively in one of CAV mode or CLV mode. Further, preference may be given to CAV mode over CLV mode.

While the timer recording of a broadcast program is scheduled in the illustrated embodiments, a user may start and stop recording through the input unit 115 or the remote-control transmitter 220.

While the optical disk device 20 is installed as an assembly in the DVD recorder 100 in the illustrated embodiments, the components of the optical disk device 20 may be incorporated in the DVD recorder 100. In such a case, it will not be a problem that the components of the optical disk device 20 are shared with other units incorporated in the DVD recorder 100 for the purpose of reduction of the number of components of the DVD recorder 100 and therefore the optical disk device 20 cannot be clearly separated from other units. That is, the form of the optical disk device 20 does not matter as long as the operations performed by the optical disk device 20 described in the illustrated embodiments can be performed. If the optical disk device 20 cannot be clearly separated from other units, the DVD recorder 100 can be considered as an information recording and reproduction apparatus.

While the programs relevant to the present invention are recorded in the flash memory 39 in the illustrated embodiments, the programs may be recorded in other recoding media (CDs, magneto optical disks, DVDs, memory cards, hard disks, USB memories, flexible disks). In that case, the programs relevant to the present invention are loaded into the flash memory 39 via a reproducing device (or an interface) corresponding to the selected recording medium. The programs relevant to the present invention may be transmitted into the flash memory 39 via networks (LANs, intranets, Internet, etc.). Namely, the programs relevant to the present invention do not have to be recorded in the flash memory 39 as long as the programs can be loaded into the flash memory 39.

While an optical disk compliant with the DVD+R standard is used as the optical disk 15 in the illustrate embodiments, a DVD-R or a DVD-RW may be used in place of the optical disk compliant with the DVD+R standard, for example. Further, a next-generation information recording medium that can be used with light having a wavelength of approximately 405 nm may be used as well.

While the optical disk 15 has one recording layer in the illustrated embodiments, the optical disk 15 may have two or more recording layers. Further, the optical disk 15 may have recording layers that are compliant with different standards, such as a recording layer compliant with the CD standard, a recording layer compliant with the DVD standard, and a recording layer compliant with the standard for next-generation information recording media that can be used with light having a wavelength of approximately 405 nm.

While the optical pickup device 23 has one semiconductor laser in the illustrated embodiments, the optical pickup device 23 may have plural semiconductor lasers that emit, for example, light beams having wavelengths different from each other. For example, the semiconductor lasers may include at least one of a semiconductor laser that emits a light beam having a wavelength of approximately 405 nm, a semiconductor laser that emits a light beam having a wavelength of approximately 660 nm, and a semiconductor laser that emits a light beam having a wavelength of approximately 780 nm. In other words, the optical disk device 20 may be configured to be available to different types of optical disks compliant with different standards.

While the video data are recorded in the optical disk 15 with use of the DVD recorder 100 equipped with the optical disk device 20 in the above illustrated embodiments, the video data may be recorded in the optical disk 15 with use of, for example, the optical disk device 20 and a personal computer equipped with a TV tuner.

The present application is based on Japanese Priority Application No. 2004-363960 filed on Dec. 16, 2004, with the Japanese Patent Office, the entire contents of which are hereby incorporated by reference.

What is claimed is:

1. An access method for use when switching from an operation of recording information into an optical disk to an operation of reproducing information from the optical disk or switching from an operation of reproducing to an operation of recording, comprising:

a calculating step of calculating a rotating speed n2 of a motor for rotating the optical disk given that a linear velocity in a first access position after the switching is equal to a linear velocity in a second access position before the switching;

a determining step of determining whether the calculated rotating speed n2 satisfies a pair of relational expressions n2>n0 and n2>n1 or a pair of relational expressions n2<n0 and n2<n1 where n0 is a rotating speed of the motor before the switching and n1 is a target rotating speed of the motor after the switching;

a changing step of changing a control mode from Constant Linear Velocity to Constant Angular Velocity and the rotating speed of the motor from n0 to n1 if either one of the pairs of relational expressions is determined to be satisfied; and a shifting step of shifting a position to be accessed from the first access position to the second access position after the changing step.

2. An information recording and reproducing apparatus capable of recording and reproducing information into and from an optical disk, comprising:

a motor that rotates the optical disk;

an optical pickup device that irradiates a light beam onto the optical disk;

a control device that, upon switching from an operation of recording information into the optical disk to an operation of reproducing information from the optical disk or switching from an operation of reproducing to an operation of recording, calculates a rotating speed n2 of the motor given that a linear velocity in a first access position before the switching is equal to a linear velocity in a second access position after the switching, determines whether the calculated rotating speed n2 satisfies a pair of relational expressions n2>n0 and n2>n1 or a pair of relational expressions n2<n0 and n2<n1 where n0 is a rotating speed of the motor before the switching and n1 is a target rotating speed of the motor after the switching, changes a control mode from Constant Linear Velocity to Constant Angular Velocity and the rotating speed of the motor from n0 to n1 if either one of the pairs of relational expressions is determined to be satisfied, and then moves the optical pickup device from the first access position to the second access position; and a processing device that records and reproduces the information into and from the optical disk through the optical pickup device.

3. A computer-readable recording medium having a program recorded therein for use in an information recording and reproducing apparatus capable of recording and reproducing information into and from an optical disk when switching from recording to reproduction or from reproduction to recording, the program comprising computer-executable instructions for:

a calculating process of calculating a rotating speed n2 of a motor for rotating the optical disk given that a linear velocity in a first access position before the switching is equal to a linear velocity in a second access position after the switching;

a determining process of determining whether the calculated rotating speed n2 satisfies a pair of relational expressions n2>n0 and n2>n1 or a pair of relational expressions n2<n0 and n2<n1 where n0 is a rotating speed of the motor before the switching and n1 is a target rotating speed of the motor after the switching;

a changing process of changing a control mode from Constant Linear Velocity to Constant Angular Velocity and the rotating speed of the motor from n0 to n1 if either one of the pairs of relational expressions is determined to be satisfied; and a moving process of moving an optical pickup device of the information recording and reproducing apparatus from the first access position to the second access position after the changing process.

* * * * *